No. 633,025. Patented Sept. 12, 1899.
R. T. MORGAN.
CULTIVATOR PLOW.
(Application filed June 2, 1899.)
(No Model.) 2 Sheets—Sheet 1.
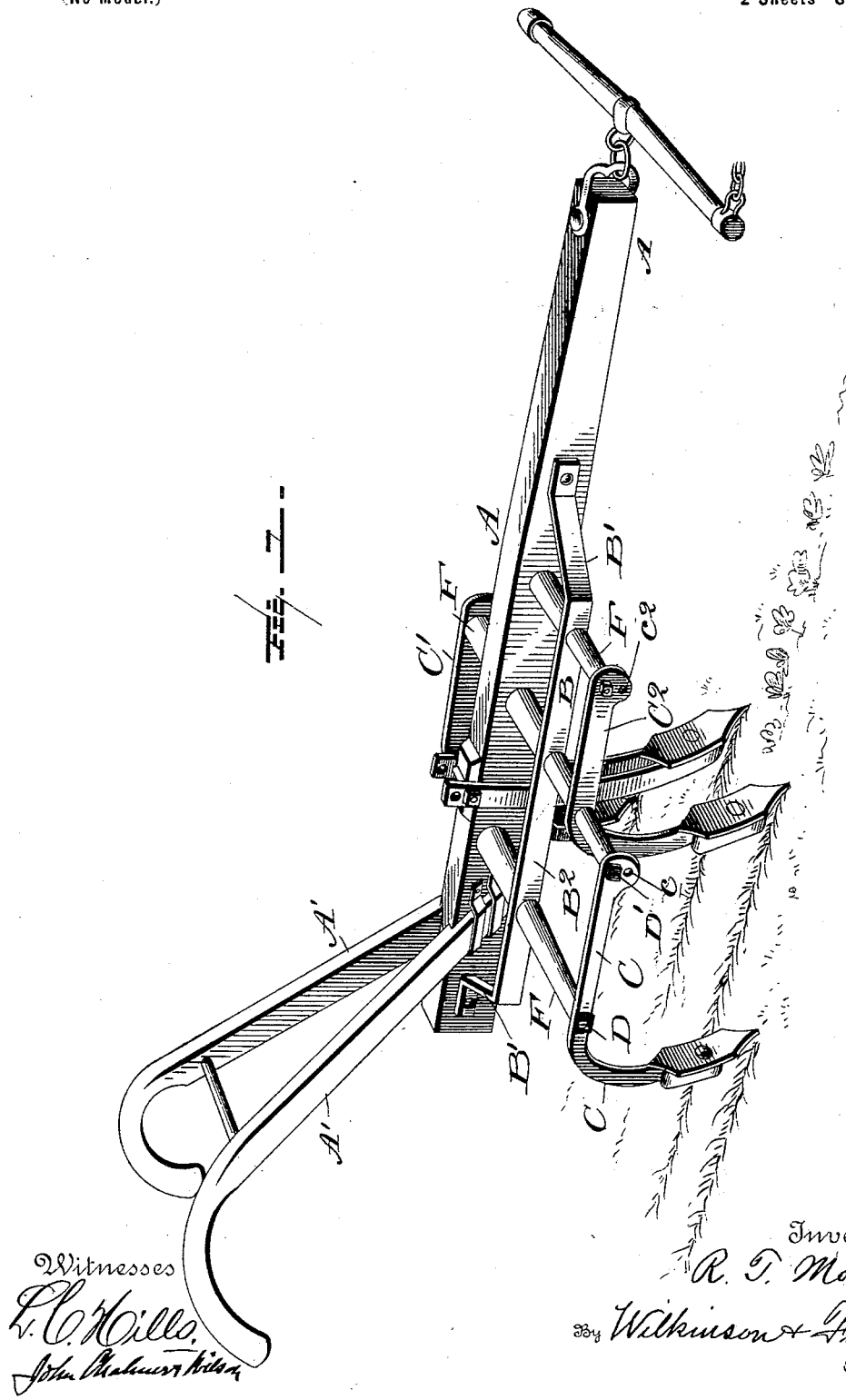

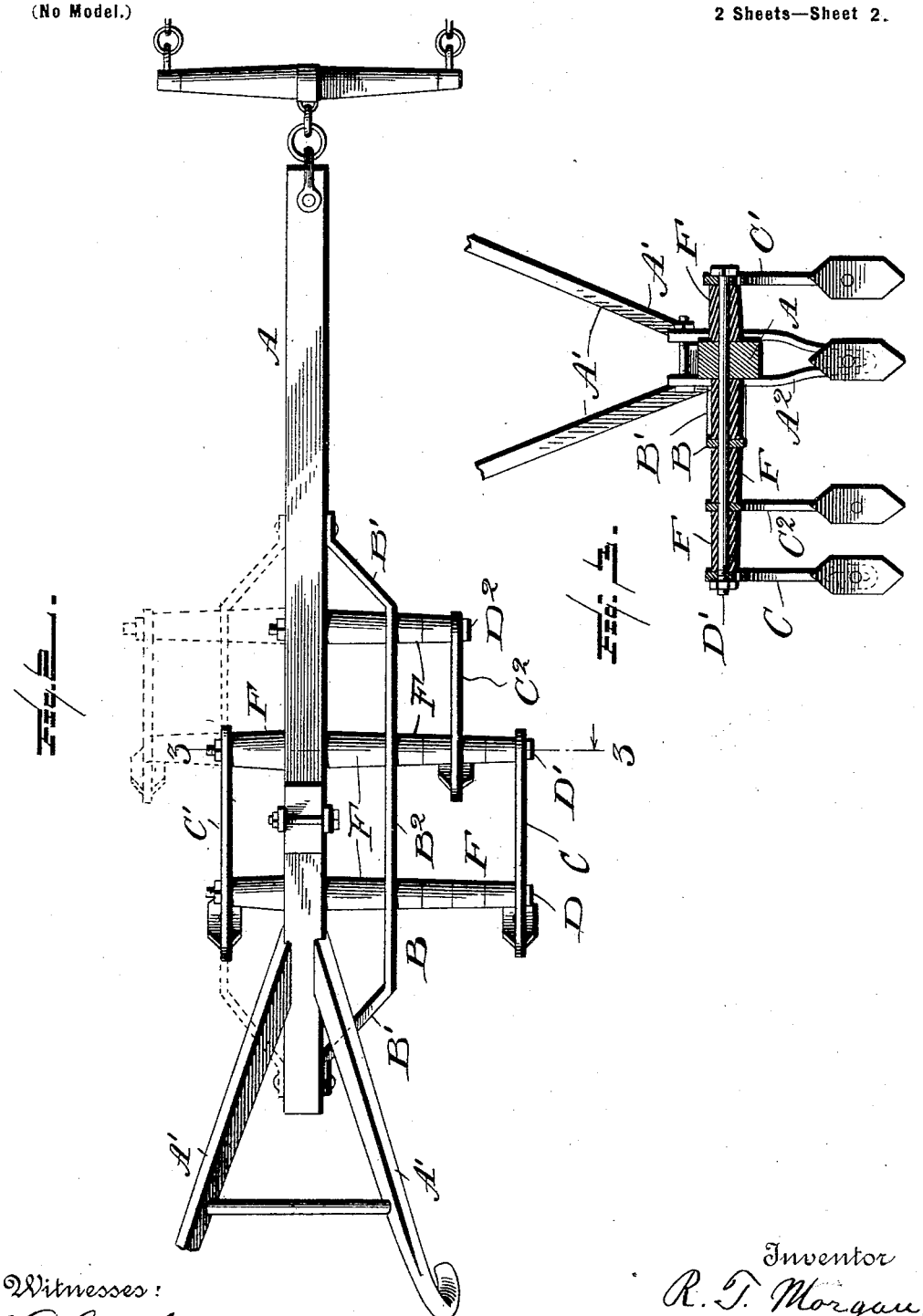

UNITED STATES PATENT OFFICE.

RUSSELL T. MORGAN, OF MAYSVILLE, GEORGIA, ASSIGNOR OF ONE-HALF TO W. F. HEAD, OF DRY POND, GEORGIA.

CULTIVATOR-PLOW.

SPECIFICATION forming part of Letters Patent No. 633,025, dated September 12, 1899.

Application filed June 2, 1899. Serial No. 719,124. (No model.)

*To all whom it may concern:*

Be it known that I, RUSSELL T. MORGAN, a citizen of the United States, residing at Maysville, in the county of Jackson and State of Georgia, have invented certain new and useful Improvements in Cultivator-Plows; and I do hereby declare the following to be a full, clear, and exact description of the invention, such as will enable others skilled in the art to which it appertains to make and use the same.

My invention relates to improvements in cultivators, and has for its object the production of a cultivator which may be used to cultivate both sides of a row of growing plants at a single operation, while at the same time it permits the animal drawing the cultivator to walk upon the side of the row.

My invention, which consists of the novel devices and combinations hereinafter described and claimed, will be understood by reference to the accompanying drawings, wherein the same parts are indicated by the same letters throughout the several views.

Figure 1 represents a perspective view of my improved cultivator. Fig. 2 represents a top plan view of the same, the full lines indicating the adjustment which permits the animal to walk upon the left side of the row, while the dotted lines indicate a somewhat different adjustment; and Fig. 3 represents a section taken on the line 3 3 in Fig. 2 and looking in the direction of the arrows.

A represents a plow-beam of common construction, to which are attached near its rear end a pair of handles A', and which also has a plow-foot $A^2$ secured thereon in the ordinary way.

B represents a stout metal strap provided with a plurality of holes for the passage of bolts and having ends B' bent over to one side, so as to be bolted, as at $b$ and $b'$, directly upon the plow-beam at either side thereof, and having straight intermediate portion $B^2$ offset from the plow-beam.

C and C' represent substantially similar short metal plow-beams curved downward at their rear to form feet for the attachment of hoes, as shown, and provided with holes therethrough for the passage of lateral bolts D and D', there being preferably a series of holes at the front ends of these beams, as seen at $c$ in Fig. 1, to permit of vertical adjustment thereof.

$D^2$ represents a third short beam similar in construction to the beams C and C', having its rear end bent downward to form a foot for attaching a hoe and having bolt-holes laterally therethrough, the forward end of the beam having a plurality of such holes, as seen at $C^2$, to permit of adjustment.

$E^2$ represents a shorter bolt, which passes through the beam A, metallic strap B, and through one of the end holes of the beam E for attaching the latter.

F represents spacing-blocks provided with axial openings for the passage of the said bolts and preferably of cylindrical form, their lengths being substantially the same. One set of these spacing-blocks is interposed between the beam A and the metallic strap B. Another set is interposed between the beam A and the side beam C'. A third set is interposed between the outer side of the metallic strap B and the side beam $c^2$. A single block is interposed between the rear end of the side beam $c^2$ and the forward end of the side beam C, while two such blocks or a block of double length are interposed between the metallic strap B and the rear of the side beam, as seen in Fig. 2.

The rods D and D' pass clear through the whole assembled frame comprising the main plow-beam A, the metallic strap B, the three side beams C, C', and $C^2$, and the interposed spacing-blocks, while the rod $d^2$ passes through the main beam and off to one side only through the metallic strap B and side beam $C^2$ and the interposed spacing-blocks. The parts are thus bound rigidly together.

With the adjustment above described and as shown the foot $A^2$ of the main beam A and the foot of the side beam C' will pass along one side of the row, along which side the animal drawing the plow walks, while the feet of the two beams C and $C^2$ will pass along on the other side of the same row, thus accomplishing the cultivation of both sides thereof at a single operation. I do not wish, however, to limit myself to the exact adjustment and arrangement of the side beams hereinbefore described, as it is obvious that their arrangement and adjustment may be varied at will within certain limits to adapt the cultivator for varying uses.

Having thus described my invention, what I claim, and desire to secure by Letters Patent of the United States, is—

1. In a cultivator, the combination with a main beam; a plow-foot thereon; a metal strap having its ends secured to one side thereof, and having a straight intermediate portion offset laterally from said main beam and parallel thereto; and spacing-blocks between the straight portion of said strap and the main beam; of short side beams arranged upon opposite sides of said main beam, and having a plurality of lateral openings therethrough; spacing-blocks; and bolts passing through the said spacing-blocks, and said strap and the said beams, and the forward ends of said side beams being adjustable vertically, substantially as described.

2. In a cultivator, the combination with a main beam, a plow-foot thereon having a loop-shaped support, the upper ends of which are fastened upon each side of the said main beam; of a side beam upon one side provided with a plow-foot the angle of which may be adjusted; of an offset on the opposite side of said beam composed of a plurality of rods extending laterally from said beam supported by a metal strap extending longitudinally with and removably connected to said beam; and plows depending from said rods with means for varying their angle of inclination independently of each other, said rods being provided with spacing-blocks, substantially as described.

3. In a cultivator, the combination with a main beam, a plow-foot thereon having a loop-shaped support, the upper ends of which are fastened upon each side of the said main beam; of a side beam upon one side provided with a plow-foot the angle of which may be adjusted; of an offset on the opposite side of said beam composed of a plurality of rods extending laterally from said beam supported by a metal strap extending longitudinally with and removably connected to said beam; and plow-feet depending from said rods with means for varying their angle of inclination consisting of a plurality of holes arranged vertically upon the end of the upper horizontal extension of the plow-standard to be engaged by its corresponding end of the laterally-extending rod, said rods being provided with spacing-blocks, substantially as described.

4. In a cultivator, the combination with a main beam; a plow-foot thereon having a loop-shaped support, the upper ends of which are fastened upon each side of said main beam and provided with means for elevating and lowering the said plow-foot; of a side beam upon one side provided with a plow-foot the angle of which may be adjusted; of an offset on the opposite side of said beam composed of a plurality of rods extending laterally from said beam supported by a metal strap extending longitudinally with and removably connected to said beam; and plows extending downwardly from said rods with means for varying their inclination independently of each other, said rods being provided with spacing-blocks, substantially as described.

In testimony whereof I affix my signature in presence of two witnesses.

RUSSELL T. MORGAN.

Witnesses:
C. N. WILSON,
J. E. PORTERFIELD.